United States Patent

Rinker et al.

[11] Patent Number: 5,865,875
[45] Date of Patent: *Feb. 2, 1999

[54] PROCESS FOR TREATING METAL OXIDE FINES

[75] Inventors: Franklin G. Rinker, Perrysburg; Deane A. Horne, Toledo; James Alan Thornton, Toledo; Valdis R. Daiga, Toledo, all of Ohio

[73] Assignee: Maumee Research & Engineering, Inc., Northwood, Ohio

[*] Notice: The term of this patent shall not extend beyond the expiration date of Pat. No. 5,601,631.

[21] Appl. No.: 797,108

[22] Filed: Feb. 10, 1997

Related U.S. Application Data

[63] Continuation-in-part of Ser. No. 519,844, Aug. 25, 1995, Pat. No. 5,601,631.

[51] Int. Cl.[6] ................................................. C21B 13/08
[52] U.S. Cl. ......................... 75/436; 75/484; 75/656; 75/668; 75/695
[58] Field of Search ............................. 75/484, 436, 656, 75/668, 695, 961

[56] References Cited

U.S. PATENT DOCUMENTS

| | | |
|---|---|---|
| 2,793,109 | 5/1957 | Huebler et al. . |
| 3,378,242 | 4/1968 | Cone et al. . |
| 3,452,972 | 7/1969 | Beggs . |
| 3,836,353 | 9/1974 | Holley . |
| 4,251,267 | 2/1981 | Beggs et al. . |
| 4,701,214 | 10/1987 | Kaneko et al. . |
| 4,836,847 | 6/1989 | Bishop et al. . |
| 4,917,723 | 4/1990 | Coyne, Jr. . |
| 5,186,741 | 2/1993 | Kotraba et al. . |
| 5,601,631 | 2/1997 | Rinker et al. .............................. 75/484 |

*Primary Examiner*—Melvyn Andrews
*Attorney, Agent, or Firm*—Brinks Hofer Gilson & Lione

[57] ABSTRACT

A process for recovering iron from iron-bearing materials including steel mill waste and iron-bearing ores. The process includes the steps of providing a mixture of iron-bearing materials having iron oxides therein and carbonaceous material. The mixture is agglomerated to form green compacts. The green compacts are then loaded into a preheated rotary hearth furnace void of compacts to form a layer of compacts no more than about two compacts high. The green compacts are heated for about 5 to 12 minutes at a temperature of between about 2200° F. to 2500° F. to reduce the compacts and evolve undesirable oxides from the compacts. The reduced compacts are then discharged from the rotary hearth furnace whereupon they are soaked to provide additional time for reaction to achieve 99% or more reduction of the iron oxides. The metallized iron compacts may then be cooled or transported hot to a steel making operation.

19 Claims, 2 Drawing Sheets

PROCESS FOR TREATING METAL OXIDE FINES

CROSS-REFERENCE TO RELATED PATENT APPLICATION

This application is a continuation-in-part of Application Ser. No. 08/519,844, filed Aug. 25, 1995, now U.S. Pat. No. 5,601,631 the disclosure of which is incorporated herein by reference.

FIELD OF THE INVENTION

This invention relates to a process for treating metal oxide fines. More particularly, this invention relates to a process for treating metal oxide fines to recover elemental iron from iron-bearing materials including iron-bearing ores, steel mill waste and other metallurgical process waste.

BACKGROUND OF THE INVENTION

Waste material is a natural byproduct of steel making and other metallurgical processes, such as the refining of iron-bearing ores. Steel making processes employing either a basic oxygen furnace or an basic oxygen furnace typically use large amounts of scrap, much of which is galvanized. Thus, the waste produced includes a dust containing oxides of iron as well as oxides of impurities such as zinc, lead and cadmium.

Basic oxygen furnace dust has been declared hazardous due to the high levels of lead and cadmium oxides and must therefore be collected and reprocessed in order to protect the atmosphere and groundwater. Basic oxygen furnace dust has been or is expected to be declared hazardous under future environmental regulations. Because of the presence of zinc and lead oxides, attempts to reclaim the iron oxides directly for reuse have not proved to be practical. Various alternatives to the direct recovery of the iron oxides have been proposed. One such proposal is to pelletize moist dust and then subject it to a very high temperature for a short period of time to sinter the pellets and to volatize the impurities. The very high temperature partially melts the iron oxide which rapidly forms a glass-like material which when it cools fuses the pellets together. The resultant iron-oxide mass is difficult to reduce and recovery of impurities is relatively ineffective.

Similarly, the recovery of elemental iron from iron-bearing materials such as iron-bearing ores have presented many difficulties. Generally, natural ore fines are too course for pelletization and too fine for iron making processes using conventional technology. Accordingly, it will be appreciated that there is still a significant need for an improved process for treating metal oxide fines to recover elemental iron from iron-bearing materials including iron-bearing ores, steel mill waste and other metallurgical process waste.

For a more detailed discussion of various known processes and apparatus for metal oxide recovery reference is made to U.S. Pat. Nos. 5,186,741; 4,701,214; 4,251,267; 3,452,972 and 2,793,109 all of which are hereby fully incorporated by reference.

An object of the present invention is to provide a process for agglomerating a dry mixture of mill waste having metal oxides including iron oxides therein, and a carbonaceous material containing at least about 20 wt % volatile matter without the addition of a binder under conditions sufficient to mobilize volatile matter from the carbonaceous material to bond the dry mixture and form green compacts for recycling that is simple and economical. Yet another object of the present invention is to provide a process for treating metal oxide fines to recover iron from steel mill waste and other metallurgical process waste that is simple and economical.

SUMMARY OF THE INVENTION

Briefly, according to this invention there is provided a process for treating metal oxide fines. The process according to the invention involves the steps of providing a mixture of iron-bearing materials having iron oxides therein and carbonaceous material. The mixture is then agglomerated under conditions sufficient to form green compacts. The green compacts are then loaded into a preheated rotary hearth furnace void of compacts to form a layer of compacts no more than about two compacts high. The green compacts are heated for about 5 to 12 minutes at a temperature of between about 2200° F. to 2500° F. to reduce the compacts and evolve undesirable elements and oxides from the compacts. The reduced compacts are then discharged from the rotary hearth furnace.

The rotary hearth furnace is divided into four zones, a preheat zone, a loading zone, a reduction zone and a discharge zone. The preheat zone of the rotary hearth furnace is a zone of the furnace that precedes the charging zone and the introduction of the green compacts. The preheat zone, void of green compacts, is preheated to a temperature of about 2000° F. After preheating of the rotary hearth, green compacts are charged into the loading zone directly onto the heated hearth of the furnace. The compacts are then conveyed to the reduction zone of the furnace and reduced. The carbon contained in the carbonaceous material within the compacts reacts with iron, zinc, lead and cadmium oxides forming the respective elemental metals and carbon monoxide. Air is added to the reduction zone to combust the carbon monoxide and volatile matter from carbonaceous material and form carbon dioxide and water vapor to release required heat for the reduction process. The reduced compacts are then discharged from the rotary hearth furnace to a soaking pit wherein the reduction of the iron is completed and over 99% of the oxides of zinc, lead and cadmium are removed. The reduced iron remains in the compacts throughout the passage through the zones of the rotary hearth furnace along with normal non-reducing oxide materials and excess carbon in the mill waste. The reduced compacts contain substantially all of the elemental iron introduced with the mill waste and virtually all of the iron oxide is reduced to the elemental metal state.

DESCRIPTION OF THE DRAWINGS

Further features and other objects and advantages of this invention will become clear from the following detailed description made with reference to the drawings in which.

DETAILED DESCRIPTION OF THE PREFERRED EMBODIMENTS

Figure 1:
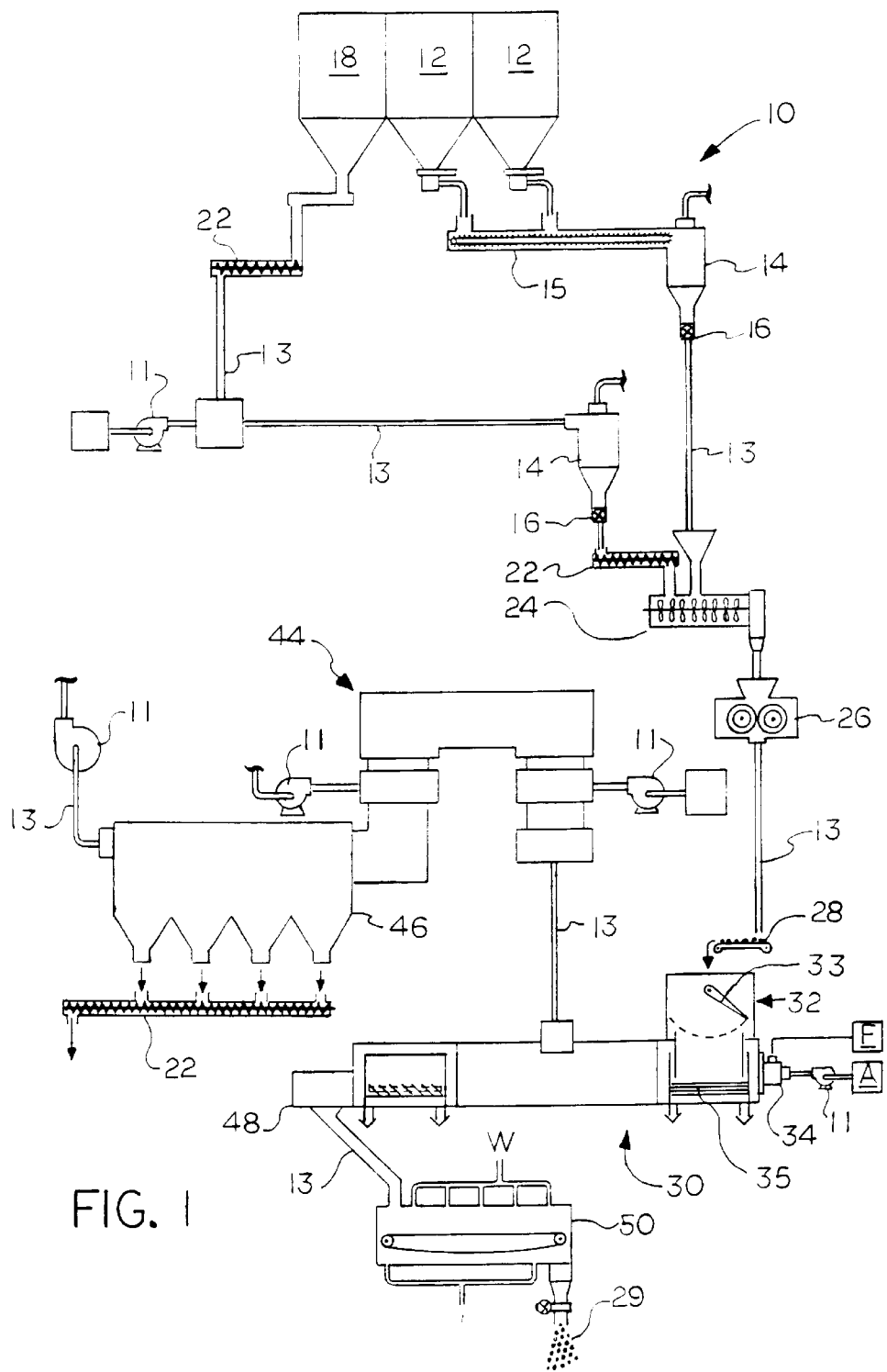
FIG. 1 is a schematic illustrating the process employed for treating metal oxide fines.
Figure 2:
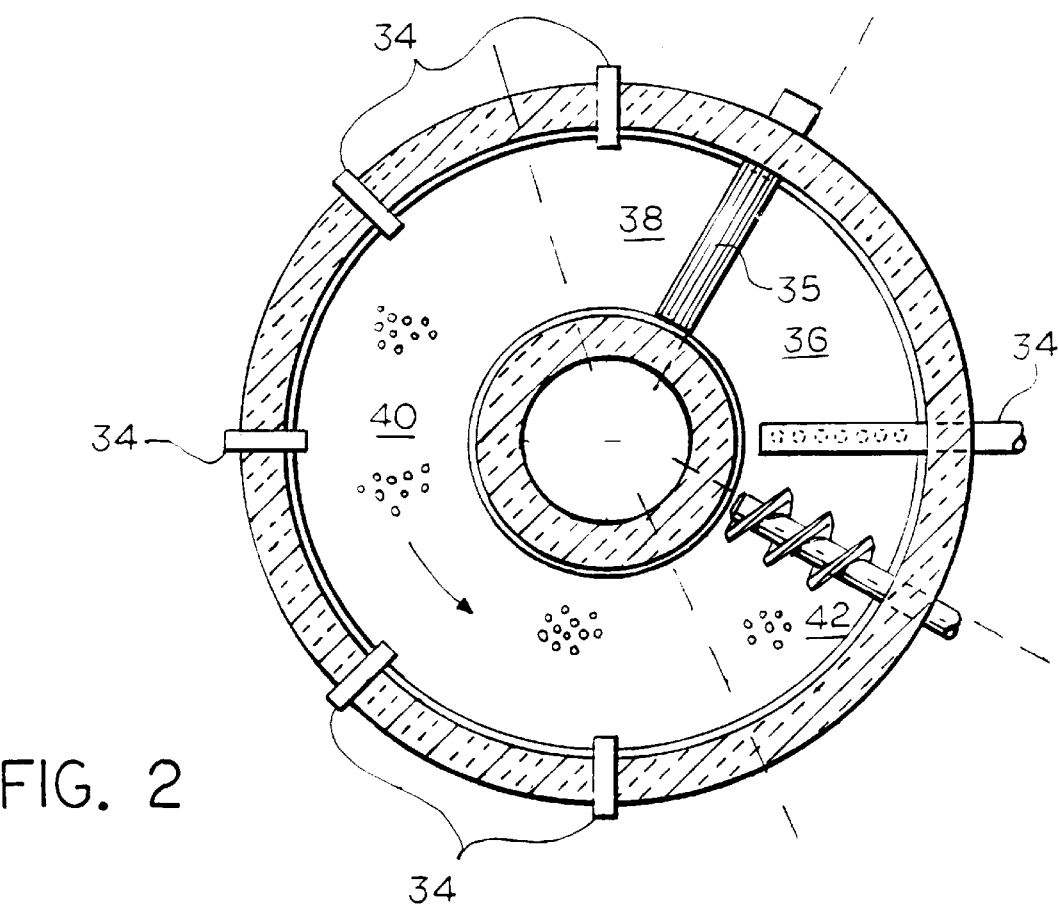
FIG. 2 is a top view of a rotary hearth furnace in accordance with the present invention.

Referring to the figures, wherein like reference characters represent like elements, there is shown a process for treating metal oxide fines 10. It should be noted that for purposes of clarity certain details of construction of the apparatus for practicing the process of treating metal oxide fines 10 are not provided in view of such details being conventional and well within the skill of the art once the invention is disclosed and explained. For example, blowers 11, piping 13 and conveyors 15 and the like as required for the handling of gaseous and particulate solid materials may be any such known commercially available components with the exception that such components may be modified as necessary by one skilled in the art to be employed in the overall system of the present invention as discussed herein. Reference is made to the Chemical Engineer's Handbook, 6th Edition, McGraw Hill, New York 1984; Kelly, E., G., Introduction To Mineral Processing, John Wiley & Sons, Inc., 1982, and to the chemical engineering industry literature generally for detailed descriptions of the various apparatus and processing structure and conditions.

Although the invention is primarily described in connection with a process for treating metal oxide fines to recover elemental iron from iron-bearing materials such as steel mill waste, basic oxygen furnace dust, rolling mill scale, or the like, collected as a result of normal steel making operations, the process may also be used with equal facility for treating metal oxide fines to recover elemental iron from most any iron-bearing material such as iron-bearing ores. Accordingly, except as otherwise claimed, the description of the same in relation to steel mill waste, basic oxygen furnace dust, rolling mill scale or the like is not to be construed as a limitation on the scope of the invention.

As shown in FIG. 1, iron-bearing material 12 such as steel mill waste, basic oxygen furnace dust, rolling mill scale, or the like, is collected as a result of normal steel making operations. The various types of iron-bearing material 12, which contain metal oxides, are suitably mixed and conveyed to a feeder bin 14 and metered through a rotary valve 16. Depending upon the content of fixed carbon within the iron-bearing material 12, additional fixed carbon may be required to be added to the mixture. More particularly, the iron-bearing material 12 must contain at least about 7 wt % fixed carbon. Steel mill waste typically contains sufficient fixed carbon whereas basic oxygen furnace duct requires the addition of fixed carbon. The iron-bearing material may range in size up to about –60 mesh.

The carbonaceous material 18 that may used in the process of the present invention may be most any suitable material rich in fixed carbon and containing more than about 20 wt % volatile matter. The carbonaceous material 18 functions as a binder for iron-bearing material 12 deficient in carbon and as a reductant for the metal oxides. In a preferred embodiment, the carbonaceous material 18 is a coal such as a bituminous coal high in fixed carbon and having more than about 20 wt % volatile matter. The volatile matter includes tarry hydrocarbons typically described as bitumen having solid or semi-solid hydrocarbons such as asphaltenes, carbenes, kerotenes and the like.

The carbonaceous material 18 is reduced in size in a crusher 22 of a type well known in the art and then pneumatically transported for storage to a feeder bin 14 by blower 11. The carbonaceous material 18 is metered from the feeder bin 14 to crusher 22 through a rotary valve 16 to provide carbonaceous material of a finely divided (pulverized) particle size for blending with the iron-bearing material 12 as required.

The iron-bearing material 12 and carbonaceous material 18, if required, are thoroughly blended to form a mixture in a mixer 24 of a type well known in the art. In the case of basic oxygen furnace dust, the basic oxygen furnace dust is blended with carbonaceous material to form a dry mixture. As used herein the term "dry mixture" refers to a mixture formed without the addition of water and containing less than 2 wt % water. The carbonaceous material 18 in the dry mixture may range in size up to about –60 mesh. The mixture of iron-bearing material 12 and carbonaceous material 18 is then agglomerated to form green compacts 28. The green compacts may be in the form of briquets by briquetting press 26 or pellets as desired.

In the case of a dry mixture, the dry mixture is agglomerated under conditions sufficient to mobilize volatile matter from the carbonaceous material 18 to function as a binder for the compacts 28. Depending upon the content level of the volatile matter in the carbonaceous material 18, e.g. bituminous coal, either high pressure or the combined effects of high pressure and a high temperature preheat of the carbonaceous material may be required to mobilize volatile matter from the carbonaceous material. For example, a carbonaceous material 18 containing at least 30 wt % volatile matter only requires application of high pressure to mobilize volatile matter and a carbonaceous material containing between about 20–30 wt % volatile matter requires application of both high temperature preheat of the iron-bearing material 12 and high pressure to mobilize volatile matter for use as a binder during agglomeration.

Figure 3:
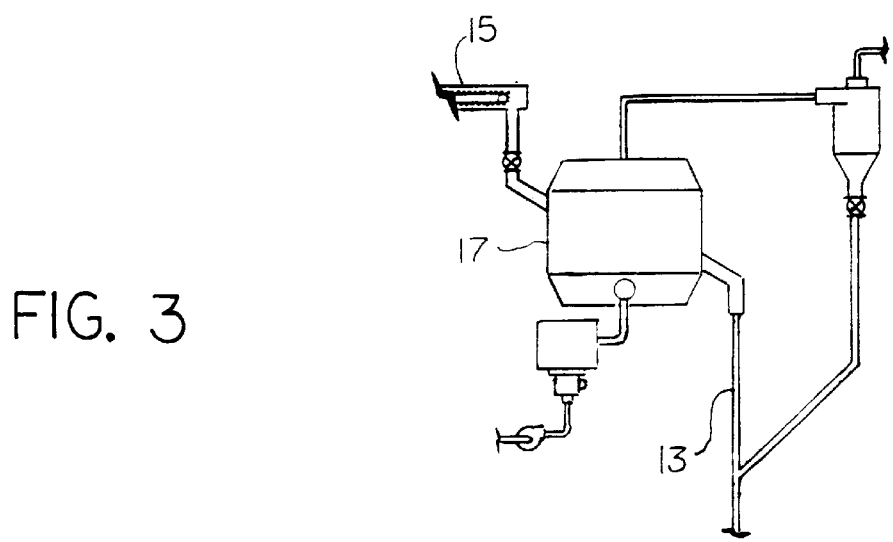
FIG. 3 is an alternative process employing a heater to preheat the carbonaceous material prior to forming the compacts.

As used herein the term "high pressure" refers to a pressure greater than about 10,000 pounds per square inch and the term "high temperature preheat" refers to a temperature greater than about 800° F. As shown in FIG. 3, the iron-bearing material 12 may be preheated in a fluidized bed 17 prior to mixing with the carbonaceous material. It will be appreciated that a carbonaceous material 18 containing less than about 20 wt % volatile matter requires the addition of a binder of a type well known in the art in the agglomeration of the mixture thereby increasing the complexity and cost of recovering elemental metal from the iron-bearing material.

The green compacts 28 are uniformly distributed onto a hearth of a rotary hearth furnace 30. The green compacts 28 are distributed onto the hearth by a conventional feeder 32 such as an electric vibratory feeder or a profiled star wheel which extends through the sidewall of the furnace 30 a suitable distance above the surface of the hearth. The hearth of the rotary furnace 30 is mounted for rotary movement about its center and is disposed in a doughnut enclosure and is sealed thereto by water seals (not shown) as well known in the art. Suitable burners 34 of a conventional design are positioned in the vertical wall of the furnace enclosure. The burners 34 may be supplied with a suitable fuel (F) such as oil or gas and combusted with air (A). The burners 34 are operably fired to provide a controlled temperature and gas composition within the rotary hearth furnace 30.

The rotary hearth furnace 30 is divided into four sequential zones, a preheat zone 36, a loading zone 38, a reduction zone 40 and a discharge zone 42. Each zone may be separated from an adjacent zone by a barrier curtain (not shown) which is constructed of an alloy suitable to withstand high temperatures and corrosive atmospheres within the zones as well known in the art. The preheat zone 36 of the rotary hearth furnace 30 is the zone of the furnace immediately preceding the loading zone 38 for the introduction of the green compacts 28. The preheat zone 36, void of green compacts 28, is heated to a desired temperature of about 2000° F. or more prior to loading of the green compacts. Preheating of the zone 36 void of treated reduced compacts 29 and immediately prior to charging of green compacts 28 allows for the heating of the entire upper surface of the hearth furnace 30 and for radiant heating of the subsequently introduced compacts from the top of the hearth and for conductive heating of the compacts from the bottom of the hearth. It will be appreciated that preheating of the hearth prior to loading of compacts 28 enables faster processing of the compacts, e.g., 5–12 minutes, than conventional systems which typically immediately load the green compacts onto the hearth after the removal of some or all of the processed compacts or pellets. In addition, dedicated preheating of a zone of the rotary hearth furnace 30 void of compacts 28 and 29 allows the furnace to reheat the rotating hearth and achieve a constant loading zone temperature as opposed to a rotary hearth furnace that experiences a cooling effect caused by the continuous charging of cold compacts to the rotating hearth of the furnace.

After the preheat zone 36 of the rotary hearth is heated to a desired temperature, green compacts 28 are charged into the loading zone 38 directly onto the heated rotating hearth of the rotary hearth furnace 30. Preferably, the green compacts 28 are uniformly distributed onto the hearth to form a layer of compacts having a mean layer depth no more than about two compacts high. By forming a layer of compacts 28 having a mean layer depth no more than about two compacts high rapid heating of the compacts is promoted by exposing upper and lower surfaces of the compacts for radiant heat transfer from the rotary hearth furnace 30.

After the compacts 28 are charged into the loading zone 38, the green compacts are transported to the reduction zone 40. In the reduction zone 40, the burners 34 are fired to obtain a furnace temperature of about 2500° F. Complete combustion occurs with a fuel effluent temperature of about 2500° F. After a furnace temperature of about 2500° F. is obtained the fuel to the burners 34 in the loading zone, reduction zone and discharge zone is shut off and only air is introduced through the burners to those zones at a velocity low enough to achieve a slow rate of combustion which is unfavorable to the formation of nitrogen oxides. The air is introduced to the zones of the hearth to combust with the volatile matter contained in the compacts and excess carbon monoxide to form carbon dioxide and release heat for the reduction process sufficient to maintain a hearth temperature of about 2100°–2450° F. to allow effective recovery of impurities, and create a reducing atmosphere necessary to prevent re-oxidation of the compacts 28. At this temperature range, the carbon contained within the compacts 28 also reacts with iron, zinc, lead and cadmium oxides forming the respective elemental metals, carbon monoxide and carbon dioxide. In a preferred embodiment, the compacts 28 are reduced in the rotary hearth furnace 30 for about 5–12 minutes at a temperature of about 2500° F. preheated combustion air is introduced along the entire length of the furnace 40 to combust with the volatile matter contained in the compacts 24 and excess carbon monoxide and hydrogen to form carbon dioxide and water and to release heat for the reduction process sufficient to maintain a temperature of about 2100°–2500° F. to allow effective recovery of impurities. In a preferred embodiment, the preheated combustion air is preheated to about 1000°–1400° F., most preferably about 1200° F.

In the discharge zone of the furnace, the preheated combustion air is enriched with oxygen and is introduced with an external fuel, e.g., natural gas, to form a high volume ratio of $CO/CO_2$ and to release heat for the final reduction process. The preheated combustion air is preferably enriched with oxygen to produce about 25–30 wt % oxygen, most preferably about 25 wt % oxygen. It will be appreciated that a high volume ratio of $CO/CO_2$ is required to suppress the oxidation of reduced iron species. Moreover, as shown in Table 1, it has been found that by combusting an external fuel at a relatively low air/fuel ratio, i.e., 5:1, preheated combustion air enriched with oxygen in the discharge zone of the furnace as opposed to combusting external fuel with combustion air without oxygen enrichment provides significantly more available heat for the reduction of the compacts.

TABLE 1

| Percent Oxygen | Preheat Temp. (°F.) | Natural Gas (lbs/lb DRI) | Oxygen Enrichment (lbs/lb DRI) | Air/Fuel Ratio Based on SCFM | Avail. Heat BTU/ft3 fuel @ 2450° F. |
|---|---|---|---|---|---|
| 21 | 1000 | 0.118 | — | 6.12 | 193 |
| 21 | 1200 | 0.106 | — | 6.12 | 218 |
| 21 | 1400 | 0.096 | — | 6.12 | 243 |
| 25 | 1000 | 0.107 | 0.055 | 5.12 | 221 |
| 25 | 1200 | 0.098 | 0.051 | 5.12 | 242 |
| 25 | 1400 | 0.090 | 0.047 | 5.12 | 263 |
| 30 | 1000 | 0.098 | 0.095 | 4.27 | 248 |
| 30 | 1200 | 0.092 | 0.088 | 4.27 | 265 |
| 30 | 1400 | 0.086 | 0.083 | 4.27 | 283 |

In this temperature range, the carbon contained within the compacts 24 reacts with iron oxides forming elemental iron, carbon monoxide and carbon dioxide.

It has been found that the reduction of metal oxides, i.e., $Fe_2O_3$, $Fe_3O_4$, FeO, PbO, CdO, ZnO and the like present in the compacts 28 is achieved at relatively low $CO/CO_2$ ratios of between about 1.5–5, and most preferably about 1.5–2.5. At a $CO/CO_2$ ratio of about 3 the furnace 30 temperature reaches about 2500° F. Previous investigations have indicated that $CO/CO_2$ ratios of more than 5 were required. Based upon an overall energy balance for the process, at a $CO/CO_2$ ratio of between about 1.5–5, the amount of carbon reductant in the compact 28 required in the process may be decreased thereby enabling the use of carbonaceous material 18 containing a higher volatile matter content without requiring excess energy or fuels to maintain the required furnace temperature. Any remaining hot carbon monoxide may react with any remaining unreacted iron oxide within the compacts 28 reducing the iron oxide and forming carbon dioxide. The reduced zinc reoxidizes over the rotary hearth and leaves the hearth furnace as a fine particulate in a hot waste gas stream.

The hot waste gas leaves the reduction zone 40 of the rotary hearth furnace 30 and is routed to a gas conditioner 44 wherein residual carbon monoxide and volatile matter is oxidized with combustion air to form carbon dioxide and water vapor and then quenched with ambient air. The reduced particulate metals formed during quenching are processed to a level acceptable for particulate collection in a fabric type dust collector 46 or baghouse and the remaining dedusted gas passed through a fan and stack to the atmosphere. The reduced particulates including zinc, lead and cadmium oxides are removed and collected for disposal or recovery.

It will be appreciated that in the case of the operation of a typical rotary hearth type furnace, exhaust gases are exhausted near the loading zone of the furnace to create a counter flow system, i.e., the effluent flows counter to the flow of the material for maximum exposure time. However, it has been found that the gases produced in the present process proximate the discharge zone of the furnace tend to flow directly to the exhaust, thereby short-circuiting the furnace through the discharge zone and loading zone of the furnace. In accordance with the present invention, the furnace is exhausted from flue 35 to provide counterflow from the discharge zone of the furnace and co-flow from the loading zone of the furnace. This allows the coal and volatile matter from the process to be combined with oxygen from air and to burn releasing heat within the furnace and allow the CO and $H_2$ in the counterflow exhaust and co-flow exhaust produced proximate the loading zone and the discharge zone of the furnace to combine with oxygen from air and to burn thereby releasing heat within the furnace.

It will also be appreciated that by providing counterflow from the discharge zone of the furnace and co-flow from the loading zone of the furnace, the loading zone and the discharge zone of the furnace are maintained at a pressure equal to atmospheric pressure to preclude furnace gases escaping through the loading or discharge mechanism in a positive pressure situation, and to preclude unwanted air from entering the furnace in a negative pressure situation.

The reduced compacts 29 are then discharged from the discharge zone 42 of the rotary hearth furnace 30 by a helical screw disposed across and spaced above the hearth to a soaking pit 48. The soaking pit 48 provides additional residence time at a temperature sufficient for completion of the reduction of the iron and over 99% completion of the removal of zinc, cadmium and lead oxide. The soaking pit 48 also allows for advanced fractionation for clean recycling and high yield of zinc-residual dust for further refinement into zinc oxide products. The reduced compacts 29 are preferably discharged from the furnace at a temperature of about 2500° F. The reduced iron remains in the compacts 29 throughout their passage through the zones of the rotary hearth furnace 30 along with normal non-reducing oxide materials in the iron-bearing material 12. The reduced compacts 29 contain all of the elemental iron units introduced with the iron bearing material 12 and virtually all of the iron oxide is reduced to the elemental metal state. Reduced compacts 29 such as this are known in the steel industry as direct reduced iron (DRI) and are a desirable source of iron units for the steel industry.

A unique feature of the invention is that the DRI compacts 29 contain a significant amount of excess carbon as they are discharged from the rotary hearth furnace 30. The excess carbon in the compacts may be adjusted from about 2–10 wt %. The excess carbon enhances the reduction reaction rate, promotes completeness of reduction and provides carbon for use in electric furnace steel making.

The DRI compacts 29 may then be cooled in an inert atmosphere such as an insulated indirect mode heat exchanger 50 of a type well known in the art sealed to exclude ambient air. The heat exchanger utilizes a suitable coolant such as water (W) to cool the DRI compacts which are then stored for subsequent use.

In the alternative, if desired, the DRI compacts 29 may be discharged from the rotary hearth furnace 30 and hot transferred to the steel making operation for subsequent use. The DRI compacts 29 may be discharged directly into refractory lined, insulated and sealed containers of a type well known in the art which exclude ambient air (not shown). Exposure of hot DRI to air allows rapid reoxidation of the elemental metal iron to iron oxide. The sealed containers which contain iron compacts 29 that are nearly oxide free, may then be transported directly to the steel making operation, thereby conserving the energy normally associated with raising the DRI compacts to the desired temperature prior to melting and refining. Melting and refining of the DRI compacts 29 can then take place using existing oxygen melting and refining techniques without the need to inject a carbon fuel to provide the heat needed for melting and refining. Thus, the DRI compacts are provided to a steel making operation well-preheated, with self-contained fuel for processing.

The documents and patents referred to herein are hereby incorporated by reference.

Having described presently preferred embodiments of the invention, it is to be understood that it may be otherwise embodied within the scope of the appended claims.

What is claimed is:

1. A process for treating metal oxide fines to recover elemental iron from iron-bearing materials including iron-bearing ores, steel mill waste and other metallurgical process waste, the process comprising the steps of:
   a) providing a mixture of iron-bearing materials having iron oxides therein and carbonaceous material;
   b) agglomerating the mixture to form green compacts;
   c) loading the green compacts into a zone of a preheated rotary hearth furnace, the rotary hearth furnace having a loading zone for receiving the green compacts, a reduction zone for reducing the compacts, and a discharge zone for discharging the reduced compacts;
   d) introducing preheated combustion air throughout the length of the furnace and an external fuel with preheated combustion air enriched with oxygen in the discharge zone of the furnace;
   e) heating the green compacts for about 5 to 12 minutes at a temperature of between about 2200° F. to 2500° F. and at a $CO/CO_2$ ratio of between about 1.5–5 in the reduction zone to reduce the compacts and evolve undesirable oxides from the compacts; and
   f) discharging the reduced compacts from the rotary hearth furnace.

2. The process of claim 1 wherein the furnace includes counterflow and co-flow exhaust to maintain the loading zone and the discharge zone of the furnace at a pressure about equal to atmospheric pressure and to minimize gaseous short circuiting from the discharge zone to the loading zone.

3. The process of claim 1 wherein the external fuel is combusted with preheated combustion air enriched with oxygen in the reduction zone of the furnace.

4. The process of claim 1 wherein the carbonaceous material contains between about 20 to 30 wt % volatile matter.

5. The process of claim 3 wherein the dry mixture is agglomerated at a pressure greater than about 10,000 pounds per square inch.

6. The process of claim 4 wherein the dry mixture is agglomerated at a pressure greater than about 10,000 pounds per square inch and a temperature greater than about 800° F.

7. The process of claim 1 wherein the green compacts are distributed onto a hearth of the rotary hearth furnace to form a layer of compacts having a mean layer depth no more than about two compacts high.

8. The process of claim 1 wherein the rotary hearth furnace includes a preheat zone void of compacts heated to about 2000° F. or more, a loading zone for charging of green compacts to the rotary hearth furnace, a reduction zone wherein carbon contained within the compacts reacts with metal oxides to form elemental metals, carbon monoxide and carbon dioxide, and a discharge zone wherein the reduced compacts containing elemental iron are discharged from the rotary hearth furnace.

9. The process of claim 8 wherein the reduction zone temperature is about 2500° F.

10. The process of claim 8 wherein air is introduced to the rotary hearth furnace at a velocity low enough to achieve a slow rate of combustion unfavorable to the formation of nitrogen oxides.

11. The process of claim 8 wherein the reduction of metal oxides is achieved at a $CO/CO_2$ ratio of between about 1.5–2.5.

12. The process of claim 8 wherein the reduction of metal oxides is achieved at a $CO/CO_2$ ratio of about 3.

13. The process of claim 1 wherein hot waste gas leaves the reduction zone of the rotary hearth furnace and is routed to a gas conditioner wherein metal oxide vapors are further cooled and oxidized.

14. The process of claim 8 wherein the compacts are discharged to a soaking pit at a temperature sufficient to complete the reduction of the iron oxide and remove over 99% of zinc, cadmium and lead oxide from the compacts.

15. The process of claim 14 wherein the reduced compacts are discharged at a temperature of about 2500° F.

16. The process of claim 1 wherein the reduced compacts contain about 2–10 wt % carbon.

17. The process of claim 8 further comprising the step of cooling the reduced compacts in an inert atmosphere.

18. The process of claim 8 further comprising the step of transporting the reduced compacts at an elevated temperature to the steel making operation.

19. A process for treating metal oxide fines to recover elemental iron from iron-bearing materials including iron-bearing ores, steel mill waste and other metallurgical process waste, the process comprising the steps of:

a) providing a mixture of iron-bearing materials having iron oxides therein and carbonaceous material;

b) agglomerating the mixture to form green compacts;

c) loading the green compacts into a zone of a preheated rotary hearth furnace, the rotary heart furnace having a loading zone for receiving the green compacts, a reduction zone for reducing the compacts, and a discharge zone for discharging the reduced compacts;

d) introducing preheated combustion air throughout the length of the furnace and an external fuel with preheated combustion air enriched with oxygen in the discharge zone of the furnace;

e) heating the green compacts for about 5 to 12 minutes at a temperature of between about 2200° F. to 2500° F. and at a $CO/CO_2$ ratio of between about 1.5–2.5 in the reduction zone to reduce the compacts and evolve undesirable oxides from the compacts; and f) discharging the reduced compacts from the rotary hearth furnace to a soaking pit at a temperature sufficient to complete the reduction of the iron oxide and remove over 99% of zinc, cadmium and lead oxide from the compacts to provide a compact containing elemental iron and about 2–10 wt % carbon.

* * * * *